United States Patent [19]

Murase et al.

[11] Patent Number: 4,803,367

[45] Date of Patent: Feb. 7, 1989

[54] LIGHT BEAM SCANNING APPARATUS EMPLOYING BEAM MODULATION IN ACCORDANCE WITH THE START OF SCAN AND END OF SCAN SIGNALS

[75] Inventors: Masakazu Murase; Hideo Ishizaka, both of Kanagawa, Japan

[73] Assignee: Fuji Photo Film Co., Ltd., Kanagawa, Japan

[21] Appl. No.: 21,879

[22] Filed: Mar. 4, 1987

[30] Foreign Application Priority Data

Mar. 4, 1986 [JP] Japan .................................. 61-47093

[51] Int. Cl.⁴ .............................................. G01J 5/16
[52] U.S. Cl. ..................................... 250/236; 358/294
[58] Field of Search ....................... 250/234, 235, 236; 358/293, 294

[56] References Cited

U.S. PATENT DOCUMENTS

| | | | |
|---|---|---|---|
| 4,587,531 | 5/1986 | Dangler | 358/293 |
| 4,663,523 | 5/1987 | Swanberg | 250/235 |
| 4,677,292 | 6/1987 | Shimada | 358/293 |

Primary Examiner—David C. Nelms
Assistant Examiner—J. L. Ruoff
Attorney, Agent, or Firm—Sughrue, Mion, Zinn, Macpeak & Seas

[57] ABSTRACT

A light beam scanning apparatus is constituted for scanning a light beam deflected by a rotating polygon mirror on a scanning surface in a main scanning direction, moving the scanning surface with respect to the light beam in a subscanning direction, and generating a picture element clock signal. The light beam scanning apparatus comprises photodetectors for respectively detecting passage of the light beam over a main scanning start point and passage thereof over a main scanning end point, and a clock signal generating circuit for receiving outputs of the photodetectors, calculating the time required for the main scanning for each of the mirror surfaces of the rotating polygon mirror, and changing a period of the picture element clock signal in the course of each main scanning so that the period is proportional to the required time with respect to the mirror surface utilized for the main scanning.

4 Claims, 3 Drawing Sheets

LIGHT BEAM SCANNING APPARATUS EMPLOYING BEAM MODULATION IN ACCORDANCE WITH THE START OF SCAN AND END OF SCAN SIGNALS

BACKGROUND OF THE INVENTION

1. Field of the Invention

This invention relates to a light beam scanning apparatus for scanning a light beam by use of a rotating polygon mirror. This invention particularly relates to a light beam scanning apparatus which eliminates adverse effects of jitter caused by rotation nonuniformity of the rotating polygon mirror or the like.

2. Description of the Prior Art

Light beam scanning apparatuses wherein a light beam is deflected and scanned by a light deflector in a main scanning direction on a scanning surface, and at the same time the scanning surface is moved with respect to the light beam in a sub-scanning direction approximately normal to the main scanning direction, have heretofore been widely used, for example, in scanning recording apparatuses and scanning read-out apparatuses. In the light beam scanning apparatuses, a rotating polygon mirror is employed in many cases as the light deflector. The rotating polygon mirror is advantageous from the viewpoint of scanning stability over other light deflectors such as a galvanometer mirror.

However, with the rotating polygon mirror, rotation nonuniformity is often caused by eccentricity with respect to a motor shaft or the like and, as a result, jitter (i.e. fluctuations in the scanning speed of the light beam along a time base) arises on the scanning surface. Besides the rotation nonuniformity, differences in finishing accuracy between the mirror surfaces of the rotating polygon mirror also cause jitter.

When jitter arises, read-out image signals obtained by scanning with the light beam or an image recorded by scanning with the light beam involves jitter components, and the image read-out accuracy or the image recording accuracy is deteriorated.

SUMMARY OF THE INVENTION

The primary object of the present invention is to provide a light beam scanning apparatus free from the adverse effects of jitter caused by rotation nonuniformity of a rotating polygon mirror or the like.

Another object of the present invention is to provide a light beam scanning apparatus suitable for conducting image read-out or image recording with a high accuracy.

The present invention provides a light beam scanning apparatus wherein a light beam deflected by a rotating polygon mirror is scanned on a scanning surface in a main scanning direction, the scanning surface is moved with respect to the light beam in a sub-scanning direction, and a picture element clock signal is generated, the light beam scanning apparatus comprising:

(i) photodetectors for respectively detecting passage of said light beam over a main scanning start point and passage thereof over a main scanning end point, and (ii) a clock signal generating circuit for receiving outputs of said photodetectors, calculating the time required for the main scanning for each of the mirror surfaces of said rotating polygon mirror, and changing a period of said picture element clock signal in the course of each main scanning so that said period is proportional to said required time with respect to the mirror surface utilized for said main scanning.

With the light beam scanning apparatus in accordance with the present invention, it is possible to prevent image recording or image read-out conducted based on the picture element clock signal from being adversely affected by jitter by changing the period of the picture element clock signal in accordance with the jitter amount. Therefore, it becomes possible to accurately conduct image recording or image read-out substantially free from jitter.

DESCRIPTION OF THE PREFERRED EMBODIMENTS

The present invention will hereinbelow be described in further detail with reference to the accompanying drawings.

Figure 1:
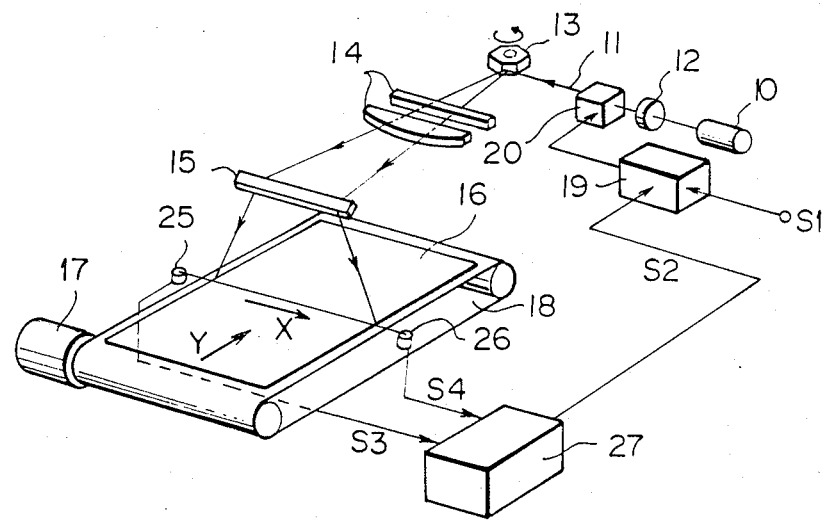
FIG. 1 is a schematic perspective view showing an embodiment of the light beam scanning apparatus in accordance with the present invention.

FIG. 1 shows an embodiment of the light beam scanning apparatus in accordance with the present invention, which is constituted for, by way of example, image recording. A light beam 11 emitted by a light source 10 constituted by a semiconductor laser, a He-Ne laser or the like is collimated by a collimator lens 12 and made to impinge upon a rotating polygon mirror 13. The light beam 11 is reflected and deflected by the rotating polygon mirror 13, made to pass through a converging lens 14 which is usually constituted by an $f\theta$ lens, and reflected by a long mirror 15 so that the light beam 11 scans a photosensitive film 16 acting as a scanning material in a main scanning direction as indicated by the arrow X. At the same time, the photosensitive film 16 is moved by an endless belt 18, which is operated by a drive device 17, in a sub-scanning direction as indicated by the arrow Y approximately normal to the main scanning direction as indicated by the arrow X. As a result, the photosensitive film 16 is two-dimensionally scanned by the light beam 11.

The light beam 11 is modulated with an image signal S1 by a modulation circuit 19 and a light modulator 20 constituted by an acousto-optic modulator (AOM) or the like. Therefore, a two-dimensional image is recorded on the photosensitive film 16 exposed to the modulated light beam 11. The beam modulation timing of the light modulator 20 is precisely controlled based on a picture element clock signal S2 which is generated as described later and fed to the modulation circuit 19.

Figure 2:
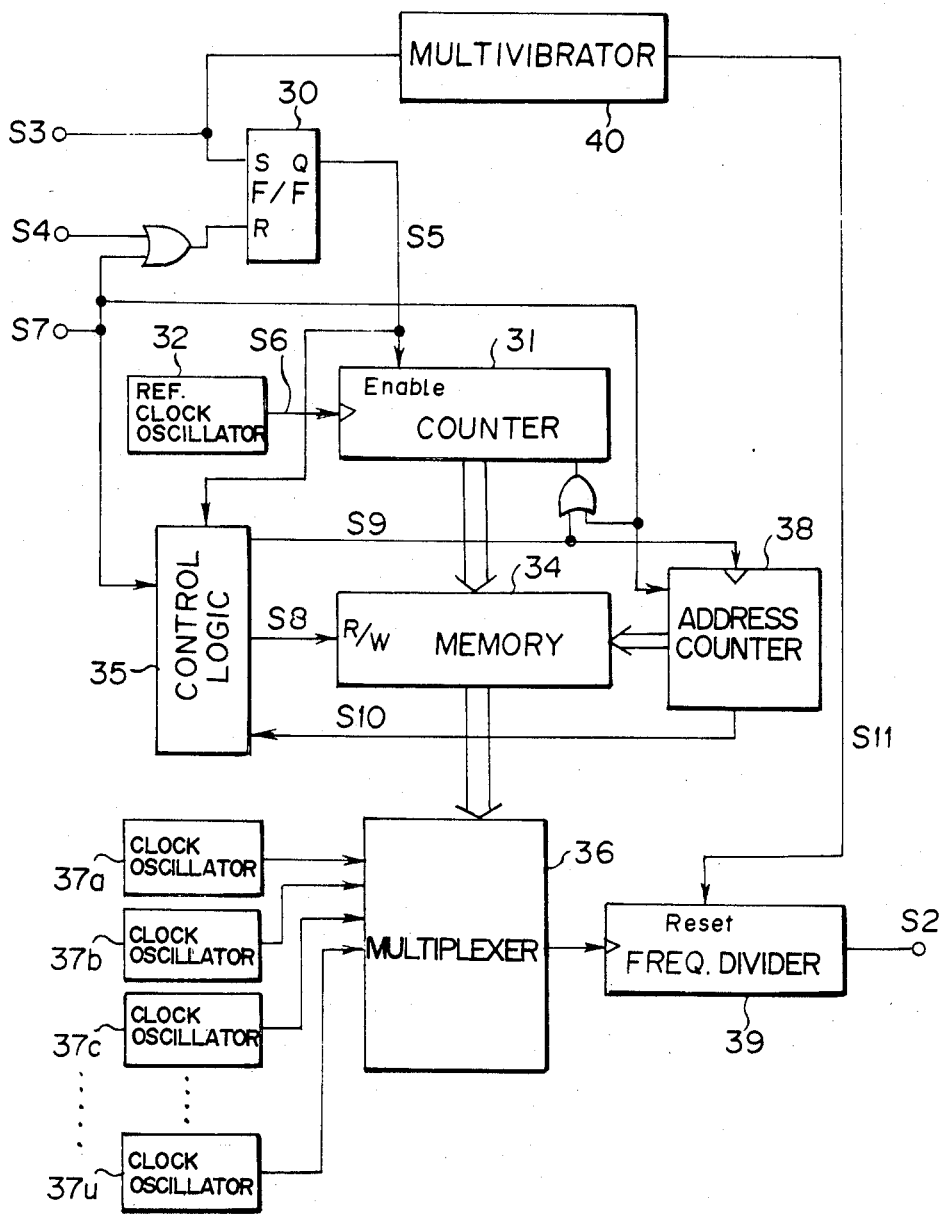
FIG. 2 is a circuit diagram showing the clock signal generating circuit in the embodiment of FIG. 1, and FIGS. 3 and 4 are circuit diagrams showing different examples of the clock signal generating circuit in the light beam scanning apparatus of the present invention.

As mentioned above, jitter may arise with the light beam 11 scanning on the photosensitive film 16 due to rotation nonuniformity of the rotating polygon mirror 13 or the like. Prevention of generation of distortion of the recorded image by eliminating adverse effects of jitter will be described hereinbelow. The passage of the light beam 11 over a main scanning start point and passage thereof over a main scanning end point are respectively detected by photodetectors 25 and 26 constituted by photodiodes or the like. A main scanning start signal S3 generated by the photodetector 25 and a main scanning end signal S4 generated by the photodetector 26 are fed to a clock signal generating circuit 27 for generating the picture element clock signal S2. FIG. 2 shows the clock signal generating circuit 27 in detail. Generation of the picture element clock signal S2 will hereinbelow be described with reference to FIG. 2. The main scanning start signal S3 and the main scanning end signal S4 are fed to a flip-flop 30. A counter 31 is controlled by an output S5 of the flip-flop 30 and counts reference clocks S6 generated by a reference clock generator 32 between the start of the main scanning and the end of the main scanning. Specifically, before the value counted by the counter 31 is stored in a memory 34 as described later, a reset signal S7 for circuit initialization is fed from a control section for the whole light beam scanning apparatus to the flip-flop 30. The reset signal S7 is controlled so that it is turned off immediately after the input of the main scanning end signal S4. After the reset signal S7 is turned off, the flip-flop 30 is set upon receiving the main scanning start signal S3, and the output S5 of the flip-flop 30 enables the counter 31 and makes it start the counting of the reference clocks S6. The count of the reference clocks S6 obtained by the counter 31 represents the jitter amount of the light beam 11 as described in detail later, and is stored in the memory 34 for each main scanning step, i.e. for each of the mirror surfaces of the rotating polygon mirror 13. Writing of the jitter amount into the memory 34 is conducted by an output S8 of a control logic device 35, which receives the reset signal S7, immediately after the main scanning end signal S4 is generated. After the jitter amount is written into the memory 34, the control logic device 35 generates a signal S9 for advancing an address counter 38 for the memory 34 by one address and resetting the counter 31. In this manner, jitter amounts inherent to the mirror surfaces of the rotating polygon mirror 13 are measured and stored sequentially. After the jitter amounts of all of the mirror surfaces of the rotating polygon mirror 13 have been measured and stored, a carry output S10 generated by the address counter 38 is fed to the control logic device 35. As a result, writing into the memory 34 is thereafter disabled, and feeding of the information on the jitter amount of each mirror surface stored in the memory 34 to a multiplexer 36 is started from the next rotation cycle of the rotating polygon mirror 13. The multiplexer 36 is connected to twenty-one clock oscillators 37a, 37b, 37c, ..., 37u. The multiplexer 36 selects one of the clock outputs of the clock oscillators 37a, 37b, 37c, ..., 37u in accordance with the information fed on the jitter amount, and sends the clock output to a frequency divider 39. In the frequency divider 39, the clock output selected as mentioned above is subjected to frequency division, and the picture element clock signal S2 is generated.

Correspondence between the information on the jitter amount and the clock outputs of the clock oscillators 37a, 37b, 37c, ..., 37u will now be described below. In this embodiment, the distance between the main scanning start point and the main scanning end point is 400mm, and the time required for the light beam 11 to scan by said distance in the main scanning direction is 2 msec. When the picture element size (the size in the main scanning direction) is 0.1 mm and no jitter arises, the frequency of the picture element clock signal S2 is calculated as $$400/(0.1\times2)\times10^{-3}=2 \text{ MHz.}$$

When the minimum value of jitter measured corresponds to 0.1 picture element and the start of the main scanning and clock generation are synchronized with each other, the frequency of the reference clocks S6 calculated as $$2/0.1=20 \text{ MHz}$$

is necessary. However, when the start of the main scanning and clock generation are synchronous with each other, the frequency of the reference clocks S6 should be higher than 20 MHz. Therefore, in this embodiment, the reference clocks S6 having a frequency of 40 MHz ($=20 \text{ MHz}\times2$) are used. In the case where jitter of the light beam 11 arises to an extent of $\pm1$ picture element at the most with respect to the reference value, in order to eliminate jitter, 21 steps (including the case where the correction value is 0) are necessary with a resolution of 0.1 picture element. The counter 31 resumes counting from 0 when the counter 31 attains a value obtained by subtracting the count corresponding to a single picture element from the count corresponding to a single main scanning period in the case where no jitter arises ($40\times10^6\times2\times10^{-3}=80,000$ pulses in this case), i.e. when the counter 31 attains a count of $80,000-(1\times40/2)=79,980$. In this manner, the counter 31 counts only the jitter amount. Specifically, the count of the counter 31 is 0 when jitter corresponding to $-1$ picture element arises, 10 when no jitter arises (i.e. when jitter corresponds to $\pm0$ picture element), and 20 when jitter corresponding to $+1$ picture element arises. The multiplexer 36 selects the clock output of the clock oscillator 37a when the count is 0, selects the clock output of the clock oscillator 37b when the count is 1, and so on, and selects the clock output of the clock oscillator 37u when the count is 20. Also, the frequency of each of the clock outputs of the clock oscillators 37a, 37b, 37c, ..., 37u is adjusted so that the clock period is proportional to the main scanning time when the corresponding jitter amount arises. In this embodiment, the frequencies of the clock outputs of the clock oscillators 37a, 37b, 37c, ..., 37u are adjusted to be 20 times the frequency of the picture element clock signal S2, and the picture element clock signal S2 is generated accurately at the recording start position on the photosensitive film 16 by the combination of the 1/20 frequency divider 39 with a one-shot multivibrator 40. Specifically, an output S11 of the one-shot multivibrator 40 triggered by the main scanning start signal S3 is fed to the reset input terminal of the frequency divider 39. The one-shot multivibrator 40 generates a pulse having a time width equal to the time required for the light beam 11 to advance from the main scanning start point to the recording start position, thereby resetting the frequency divider 39 for the time equal to the width of the pulse. The reset condition of the frequency divider 39 is released at the time of recording start on the photosensitive film 16, and the frequency divider 39 generates the picture element clock signal S2 with the same phase as the recording start timing. Since the phase of the picture element clock signal S2 is matched with the recording start timing in this manner, the phase error is restricted to 1/20 picture element.

The frequency of the picture element clock signal S2 is changed in accordance with the jitter amount as mentioned above, and the period of the picture element clock signal S2 is controlled to be proportional to the time required for the main scanning of the light beam 11. Therefore, the light beam 11 is always modulated for each predetermined picture element size, and it becomes possible to accurately conduct recording free from the adverse effects of jitter.

Figure 3:
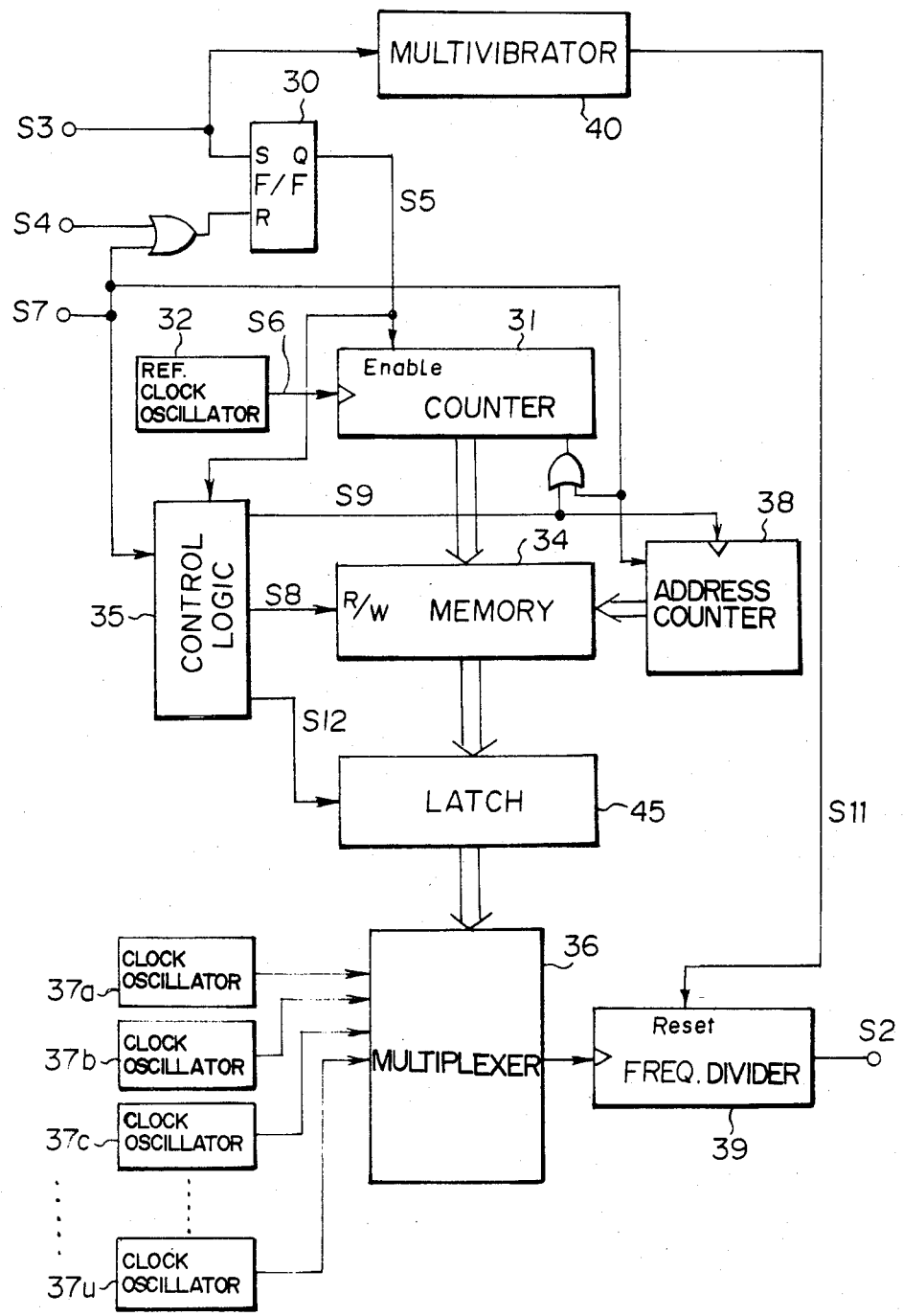

Another example of the clock signal generating circuit 27 will hereinbelow be described with reference to FIG. 3. In FIG. 3, similar elements are numbered with the same reference numerals with respect to FIG. 2. The clock signal generating circuit shown in FIG. 3 is provided with a latch 45 disposed between the memory 34 and the multiplexer 36. The latch 45 latches the data in the memory 34 upon receiving an output S12 generated by the control logic device 35 after the address counter 38 is advanced by a single address by the output S9 of the control logic device 35. With this configuration, after the jitter amounts of the mirror surfaces of the rotating polygon mirror 13 are stored in the memory 34 in the course of the first one-turn rotation of the rotating polygon mirror 13, the jitter amounts of the mirror surfaces sent to the multiplexer 36 are updated sequentially each time the rotating polygon mirror 13 is rotated one turn. Therefore, in this case, even though the jitter amounts with respect to the mirror surfaces of the rotating polygon mirror 13 fluctuate with a long period until the end of the recording on the photosensitive film 16, it is possible to eliminate the adverse effects of the fluctuation in each main scanning step.

Figure 4:
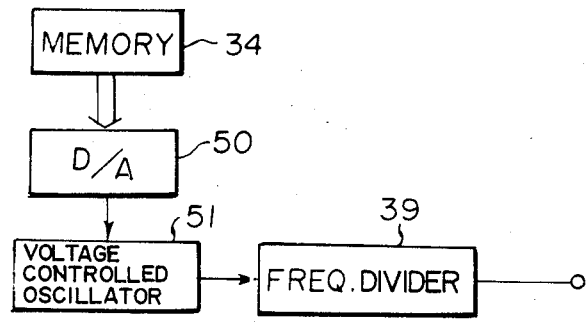

In FIGS. 2 and 3, the clock signal generating circuit 27 is constituted so that the clock outputs of the clock oscillators 37a, 37b, 37c, . . . , 37u are selected in accordance with the digital information on the jitter amount fed to the multiplexer 36. However, the multiplexer 36 and the clock oscillators 37a, 37b, 37c, . . . , 37u may be replaced by a D/A converter 50 and a voltage controlled oscillator 51 as shown in FIG. 4. In this case, the D/A converter 50 generates an analog voltage corresponding to the information on the jitter amount received from the memory 34 as shown in FIGS. 2 and 3. Based on the analog voltage, the voltage controlled oscillator 51 generates the clock signal having a period proportional to the scanning time in each main scanning step. As the voltage controlled oscillator 51, a voltage controlled crystal oscillator (VXCO) or the like exhibiting high frequency stability should preferably be used.

As is well known, there has heretofore been proposed a light beam scanning read-out apparatus wherein a light beam is two-dimensionally scanned on a read-out original carrying an image recorded thereon, light emitted by the read-out original, light reflected by the read-out original or light transmitting through the read-out original in the course of the scanning is detected by a photodetector such as a photomultiplier, and an electric read-out image signal representing the image recorded on the read-out original is obtained. In the light beam scanning read-out apparatus, signals continuously output by the photodetector such as the photomultiplier are integrated for a unit time based on a picture element clock signal synchronously with the scanning of the light beam, thereby to obtain the read-out image signal. The light beam scanning apparatus in accordance with the present invention is applicable also to the image read-out apparatus. In this case, it is possible to restrict generation of distortion of the read-out image signal by eliminating the adverse effects of jitter.

We claim:

1. A light beam scanning apparatus wherein a light beam deflected by a rotating polygon mirror is scanned on a scanning surface in a main scanning direction, the scanning surface is moved with respect to the light beam in a sub-scanning direction, and a picture element clock signal is generated, the light beam scanning apparatus comprising:
    (i) photodetectors for respectively detecting passage of said light beam over a main scanning start point and passage thereof over a main scanning end point, and
    (ii) a clock signal generating circuit for receiving outputs of said photodetectors, calculating the time required for the main scanning for each of mirror surfaces of said rotating polygon mirror, and changing a period of said picture element clock signal in the course of each main scanning so that said period is proportional to said required time with respect to the mirror surface utilized for said main scanning, wherein said clock signal generating circuit comprises a memory for storing digital information on a jitter amount of said light beam for each of said mirror surfaces of said rotating polygon mirror such that a time required for the main scanning of each of the mirror surfaces is stored and is used by the apparatus for said main scanning, said picture element clock signal period being changed in accordance with said stored time for each of said mirror surfaces.

2. An apparatus as defined in claim 1 wherein said clock signal generating circuit further comprises a plurality of clock oscillators for generating different clock outputs having a frequency adjusted so that the clock period is proportional to the time required for the main scanning when the jitter amount of said light beam for each of said mirror surfaces of said rotating polygon mirror arises, a multiplexer for receiving the digital information on the jitter amount of each of said mirror surfaces of said rotating polygon mirror and selecting one of said clock outputs of said clock oscillators in accordance with the received digital information on the jitter amount, and a frequency divider for generating said picture element clock signal by frequency division of the selected clock output.

3. An apparatus as defined in claim 2 wherein said clock signal generating circuit further comprises a latch disposed between said memory and said multiplexer for latching the digital information on the jitter amount stored in said memory.

4. An apparatus as defined in claim 1 wherein said clock signal generating circuit further comprises a D/A converter for generating an analog output corresponding to the digital information on the jitter amount received from said memory, a voltage controlled oscillator for receiving said analog output from said D/A converter and generating a clock output having such a frequency that the clock period is proportional to the time required for the main scanning, and a frequency divider for generating said picture element clock signal by frequency division of the clock output generated by said voltage controlled oscillator.

* * * * *